United States Patent
Tahara et al.

(12) 
(10) Patent No.: US 6,551,670 B2
(45) Date of Patent: Apr. 22, 2003

(54) CHIRAL NEMATIC LIQUID CRYSTAL COMPOSITION AND LIQUID CRYSTAL OPTICAL ELEMENT

(75) Inventors: Shinya Tahara, Yokohama (JP); Satoshi Niiyama, Yokohama (JP)

(73) Assignee: Optrex Corporation, Tokyo (JP)

( * ) Notice: Subject to any disclaimer, the term of this patent is extended or adjusted under 35 U.S.C. 154(b) by 38 days.

(21) Appl. No.: 09/824,102

(22) Filed: Apr. 3, 2001

(65) Prior Publication Data

US 2002/0134966 A1 Sep. 26, 2002

(30) Foreign Application Priority Data

Apr. 5, 2000 (JP) .......................................... 2000-103987
May 12, 2000 (JP) .......................................... 2000-140685
Jan. 12, 2001 (JP) .......................................... 2001-005409

(51) Int. Cl.[7] .................... C09K 19/52; C09K 19/30; C09K 19/20; G02F 1/1343
(52) U.S. Cl. ................ 428/1.3; 252/299.1; 252/299.63; 252/299.69; 349/145
(58) Field of Search ........................ 252/299.01, 299.63, 252/299.67; 349/145; 428/1.1, 1.3

(56) References Cited

U.S. PATENT DOCUMENTS 3,973,830 A * 8/1976 Tsukamoto et al. ..... 252/299.01
5,681,504 A * 10/1997 Buchecker et al. ..... 252/299.61

* cited by examiner

*Primary Examiner*—Shean C. Wu
(74) *Attorney, Agent, or Firm*—Oblon, Spivak, McClelland, Maier & Neustadt, P.C.

(57) ABSTRACT

Presentation of a chiral nematic liquid crystal optical element which is bright within a wide temperature range and which has a high contrast.

A liquid crystal composition comprising an optically active compound of the formula $R^1-X^1-A^1-C^*HY^1-(CH_2)_m X^2-A^2-(X^3-A^3)_n-(X^4-A^4)_p-X^5-R^2$ and a nematic liquid crystal, wherein each $R^1$ and $R^2$ is an alkyl group, etc., each of $X^1, X^2, X^3, X^4$ and $X^5$ is a single bond, etc., each of $A^1, A^2, A^3$ and $A^4$ is a cyclic group, $C^*$ is an asymmetric carbon atom, $Y^1$ is a methyl group, etc., m is an integer of from 0 to 5, and each of n and p is 0 or 1.

21 Claims, 1 Drawing Sheet

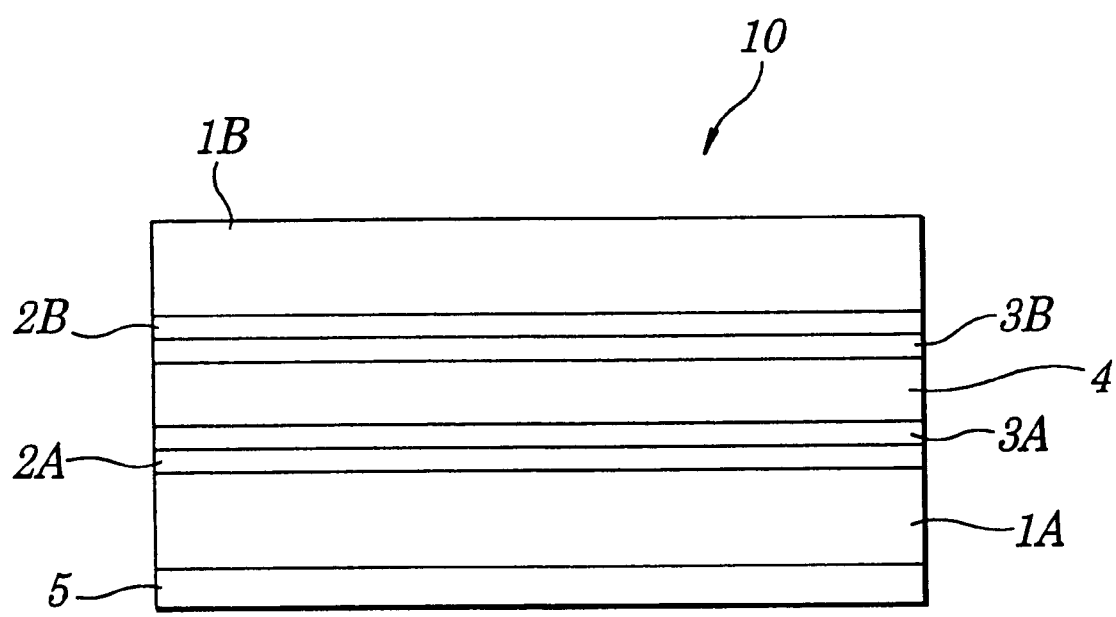

CHIRAL NEMATIC LIQUID CRYSTAL COMPOSITION AND LIQUID CRYSTAL OPTICAL ELEMENT

FIELD OF THE INVENTION

The present invention relates to a liquid crystal optical element which controls the transmittance, scattering or reflectance of an element by the application conditions of an electric field and which is useful for e.g. a display element, an optical shutter or a light control element, and a liquid crystal composition to be used therefor.

DISCUSSION OF BACKGROUND

At present, a liquid display element such as TN, STN or TFT is practically used. As other liquid crystal display elements, practical use of e.g. a ferroelectric/antiferroelectric liquid crystal display element characterized in high speed response/memory function, and a guest/host display element attracting attention by colorization, is being studied.

Further, a liquid display element (hereinafter referred to also as cholesteric LCD) by means of a chiral nematic (cholesteric) liquid crystal, has a memory function and is capable of presenting a bright reflection type display, and thus attention is drawn thereto as a liquid crystal display element of next generation, and its practical use is being studied. The chiral nematic liquid crystal has a memory function such that once a predetermined voltage is applied, the alignment state can be maintained to be stable in a selectively reflective planar state or a scattering focalconic state, without applying a voltage thereafter The chiral nematic liquid crystal can be obtained by mixing a nematic liquid crystal and an optically active compound. Such a chiral nematic liquid crystal is interposed between a pair of parallel substrates to constitute a liquid crystal optical element. When the center axis (the helical axis) of a helix of a helical structure wherein directors of the liquid crystal rotate every constant period, is aligned in a perpendicular direction on an average to the substrates, the liquid crystal optical element having the chiral nematic liquid crystal interposed, will reflect circularly polarized light corresponding to the direction of the helix. The center wavelength of the reflected light will be a product of the distance (the helical pitch) on the helical axis where directors of the liquid crystal parallel with the substrate surfaces undergo one rotation by the helix, and the average refractive index at the two-dimensional surface parallel to the substrate surfaces of the nematic liquid crystal. Such a phenomenon wherein the chiral nematic liquid crystal reflects circularly polarized light having a certain specific wavelength by the helical pitch and the average refractive index of the liquid crystal, is referred to as selective reflection.

The selective reflection wavelength ($\lambda$) is substantially equal to a product ($\lambda=n \cdot p$) of the average refractive index (n) of the liquid crystal composition and the helical pitch (p) of the liquid crystal composition. Further, the helical pitch can be calculated by $p=1/(c \cdot HTP)$ from the amount (c) of the optically active compound added and the constant (HTT (=Helical Twisting Power)) of the optically active compound. Thus, the selective reflection color is determined by the type and the added amount of the optically active compound.

The liquid crystal alignment showing the selective reflection includes a case wherein the helical axes are substantially completely perpendicular to the substrate surfaces (which will be referred to as perfect planar state), and a case wherein the average of helical axes of liquid crystal domains divided in a plurality, is substantially perpendicular to the substrate surfaces (which will be referred to as imperfect planar state or simply as planar state). The perfect planar liquid crystal alignment and the planar liquid crystal alignment show different reflection behaviors. With the perfect planar liquid crystal alignment, regular reflection is large against incident light, and it shows a very high reflection at a certain specific viewing angle. On the other hand, with the planar liquid crystal alignment, regular reflection is relatively small, and it shows a high reflection behavior within a relatively wide viewing angle. Further, as another liquid crystal alignment, the chiral nematic liquid crystal may take an alignment wherein helical axes of plural liquid crystal domains are aligned in random directions or in non-perpendicular directions to the substrates (which will be referred to as focalconic state). In the focalconic state, many chiral nematic liquid crystals show a weak scattering state, and will not reflect light having a certain specific wavelength as in the case of the selective reflection.

These liquid crystal states are stable even when no electric field is applied. Further, the selective reflection by the planar state or perfect planar state, is bright, since no polarizing plate is employed, and further, the viewing angle is also wide with the planar state. Thus, a liquid crystal optical element employing a chiral nematic liquid crystal and utilizing the selective reflection, is a liquid crystal optical element which is bright and has a wide viewing angle, whereby a power consumption is small, since the liquid crystal alignment can be maintained even in a state where no electric field is applied (i.e. capable of functioning in a memory mode).

The planar state and the focalconic state can be changed to each other by application of an electric field. The change from the focalconic state to the planar state takes place via liquid crystal alignment so-called homeotropic wherein the liquid crystal molecules will be substantially parallel with the direction of application of the electric field, and accordingly, the highest voltage will be required.

SUMMARY OF THE INVENTION

The present invention has an object to provide a liquid crystal optical element which has bright selective reflection, a high contrast and a low driving voltage and which can be used in a wide temperature range (which is particularly excellent in the quality maintenance at a low temperature), and a liquid crystal composition to be used for such a liquid crystal optical element.

The present invention provides a liquid crystal composition comprising an optically active compound of the following formula (1) and a nematic liquid crystal:

$$R^1-X^1-A^1-C^*HY^1-(CH_2)_m-X^2-A^2-(X^3-A^3)_n-(X^4-A^4)_p-X^5-R^2 \quad (1)$$

wherein the symbols have the following meanings:

$R^1$ is a $C_{1-10}$ alkyl group, a $C_{1-10}$ alkenyl group or a hydrogen atom;

$R^2$ is a $C_{1-10}$ alkyl group, a $C_{1-10}$ alkenyl group, a hydrogen atom or a cyano group;

each of $X^1$, $X^2$ and $X^5$ which are independent of one another, is —COO—, —OCO—, —OCH$_2$—, —O— or a single bond;

each of $X^3$ and $X^4$ which are independent of each other, is —COO—, —OCO—, —CH$_2$CH$_2$—, —C≡C—, —O— or a single bond;

each of $A^1$ to $A^4$ which are independent of one another, is an unsubstituted trans-1,4-cyclohexylene group, a 1,4-phenylene group which may have at least one hydrogen atom substituted by a halogen atom, a pyrimidin-2,5-diyl group or a 1,3-dioxan-2,5-diyl group;

$C^*$ is an asymmetric carbon;

$Y^1$ is a $C_{1-2}$ alkyl group which may have at least one hydrogen atom substituted by a halogen atom, or a halogen atom;

m is an integer of from 0 to 5; and each of n and p which are independent of each other, is 0 or 1.

Further, in the above liquid crystal composition, the nematic liquid crystal preferably has a refractive index anisotropy ($\Delta n$) of at least 0.18, a nematic isotropic phase transition temperature (Tc) of at least 70° C. and a dielectric anisotropy ($\Delta \in$) of at least 5. Further, it is preferred that the above liquid crystal composition selectively reflects visible light in the planar state.

Further, the present invention provides a liquid crystal optical element having the above liquid crystal composition interposed between a pair of electrode-attached substrates.

In the above liquid crystal optical element, it is preferred that row electrodes and column electrodes are provided on one substrate and the other substrate, respectively.

Further, in the above liquid crystal optical element, it is preferred that the distance (the cell gap) of the pair of opposing electrodes is from 2 to 20 μm.

BRIEF DESCRIPTION OF THE DRAWINGS

FIG. 1 is a schematic cross-sectional view illustrating an embodiment of the liquid crystal optical element of the present invention.

EXPLANATION OF SYMBOLS 1A and 1B: substrates 2A and 2B: Electrodes 3A and 3B: Organic thin films or inorganic thin films 4: Liquid crystal composition 5: Light absorber 10; Liquid crystal display element

DETAILED DESCRIPTION OF THE PREFERRED EMBODIMENTS

The compound (1) contained in the liquid crystal composition of the present invention is an optically active compound containing an asymmetric carbon atom ($C^*$) in its structure. The absolute configuration of the group bonded to the asymmetric carbon atom may be R or S.

The compound (1) is a compound having 2, 3 or 4 cyclic groups and having an asymmetric carbon atom between a cyclic group and a cyclic group. A compound having an asymmetric carbon atom between a cyclic group and a cyclic group, has high HTP, such being desirable. When the cyclic groups are two, the viscosity is low, but Tc tends to be low. On the other hand, if cyclic groups are three, Tc increases. Further, when cyclic groups are four, Tc increases to a large extent.

In the compound (1), $R^1$ is a $C_{1-10}$ alkyl group, a $C_{1-10}$ alkenyl group or a hydrogen atom. $R^2$ is a $C_{1-10}$ alkyl group, a $C_{1-10}$ alkenyl group, a hydrogen atom or a cyano group.

The $C_{1-10}$ alkyl group may be a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, a 2-methylbutyl group, a 1,2-dimethylpropyl group, a hexyl group, an isohexyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1,3-dimethylbutyl group, a 2,3-dimethylbutyl group, a 3,3-dimethylbutyl group, a 1-ethylbutyl group, a 2-ethylbutyl group, a 1,1,2-trimethylpropyl group, a 1,2,2-trimethylpropyl group, a 1-ethyl-1-methylpropyl group, or a 1-ethyl-2-methylpropyl group, and it may be a combination of these.

The $C_{1-10}$ alkenyl group may be a group having one carbon—carbon bond of the above alkyl group substituted by a carbon—carbon double bond.

$R^1$ is preferably a $C_{1-10}$ alkyl group or a hydrogen atom, and $R^2$ is preferably a $C_{1-10}$ alkyl group, a hydrogen atom or a cyano group. More preferably, $R^1$ is a $C_{1-6}$ alkyl group or a hydrogen atom, and $R^2$ is a $C_{1-6}$ alkyl group, a hydrogen atom or a cyano group.

When each of $R^1$ and $R^2$ is an alkyl group, if it has a branched structure, the compatibility tends to be low or Tc tends to be low. Accordingly, it preferably has a straight chain structure, and particularly preferred is a $C_{3-5}$ straight chain alkyl group. Further, when each of $R^1$ and $R^2$ is an alkenyl group, it is preferably a $C_{2-6}$ alkenyl group, more preferably a $C_{2-6}$ trans alkenyl group. Each of $R^1$ and $R^2$ is particularly preferably a $C_{3-5}$ straight chain alkyl group, an isobutyl group, a hydrogen atom or a $C_{2-6}$ trans alkenyl group.

Further, $R^2$ is particularly preferably a cyano group. The compound (1) wherein $R^2$ is a cyano group, has a large $\Delta \in$. Further, when $R^2$ is a cyano group, $X^5$ is preferably a single bond, and it is further preferred that the cyclic group bonded to $-X^5-R^2$ is a 1,4-phenylene group having at least one hydrogen atom substituted by a halogen atom.

Each of $X^1$, $X^2$ and $X^5$ which are independent of one another, is —COO—, —OCO—, —OCH$_2$—, —O— or a single bond. Each of $X^1$ and $X^5$ is preferably a single bond or —O—, whereby the viscosity can easily be lowered without lowering Tc. $X^2$ is preferably a single bond, —COO— or —OCO—. When $X^2$ is a single bond, —COO— or —OCO—, it is easy to make the viscosity low, and HTP high, such being desirable.

Each of $X^3$ and $X^4$ which are independent of each other, is —COO—, —OCO—, —CH$_2$CH$_2$—, —C≡C—, —O— or a single bond. Particularly preferred is —COO—, —C≡C— or a single bond.

Each of $A^1$, $A^2$, $A^3$ and $A^4$ which are independent of one another, is an unsubstituted trans-1,4-cyclohexylene group, a 1,4-phenylene group which may have at least one hydrogen atom substituted by a halogen atom, a pyrimidin-2,5-diyl group, or 1,3-dioxan-2,5-diyl group. $A^1$ is preferably a 1,4-phenylene group which may have at least one hydrogen atom substituted by a halogen atom, it is particularly preferably an unsubstituted 1,4-phenylene group, since it is readily available.

Each of $A^2$, $A^3$ and $A^4$ which are independent of one another, is preferably an unsubstituted trans-1,4-cyclohexylene group, an unsubstituted 1,4-phenylene group or a 1,4-phenylene group having at least one hydrogen atom substituted by a halogen atom. When $A^2$, $A^3$ or $A^4$ is an unsubstituted trans-1,4-cyclohexylene group, the viscosity can be made low. Accordingly, it is more preferred that at least one selected from $A^2$, $A^3$ and $A^4$ is an unsubstituted trans-1,4-cyclohexylene group. When each of $A^2$, $A^3$ and $A^4$ is a 1,4-phenylene group having at least one hydrogen atom substituted by a halogen atom, such a halogen atom is preferably a fluorine atom, and particularly preferred is a monofluoro-1,4-phenylene group or a difluoro-1,4-phenylene group. The fluorine atom is expected to have an effect to lower the viscosity without lowering Tc. The position for substitution of the halogen atom is not particularly limited.

$Y^1$ is a $C_{1-2}$ alkyl group which may have at least one hydrogen atom substituted by a halogen atom, or a halogen atom. As $Y^1$, a $C_{1-2}$ alkyl group which may have at least one hydrogen atom substituted by a halogen atom, is preferred, and particularly preferred is —$CH_3$—, —$CH_2CH_3$— or —$CF_3$, whereby it is easy to lower the viscosity and increase HTP without lowering Tc. Thus, when an asymmetric carbon atom has a substituent having a large steric hindrance, HTP can be made higher.

The compound (1) is preferably one wherein $A^1$ is an unsubstituted 1,4-phenylene group, and $Y^1$ is a methyl group which may have at least one hydrogen atom substituted by a halogen atom.

m is 0, 1, 2, 3, 4 or 5. m is preferably 0, 1 or 2, particularly preferably 0 or 1. When the steric hindrance around an asymmetric carbon atom is large, m is preferably 1, since it m is 0, Tc tends to be low.

The compound (1) which satisfies the above described conditions is a compound having a high HTP, a high Tc and a low viscosity. These characteristics can be adjusted depending upon the particular purposes by selecting and combining the above-described respective conditions.

The compound (1) is preferably a compound (1A), a compound (1B) or a compound (1C), more preferably a compound (1-1), a compound (1-2) or a compound (1-3)

$$R^1-X^1-A^1-C^*HY^1-(CH_2)_m-X^2-A^2-(A^3)_n-X^5-R^2 \quad (1A)$$

$$R^1-X^1-A^1-C^*HY^1-(CH_2)_m-X^2-A^2-X^3-A^3-X^5-R^2 \quad (1B)$$

$$R^1-X^1-A^1-C^*HY^1-(CH^2)_m-X^2-A^2-X^3-A^3-X^4-A^4-X^5-R^2 \quad (1C)$$

$$R^1-A^{11}-C^*H(CH_3)-CH_2-A^{21}-R^2 \quad (1\text{-}1)$$

$$R^1-A^{12}-C^*H(CH_3)-CH_2-A^{22}-X^3-A^{32}-R^2 \quad (1\text{-}2)$$

$$R^1-A^{13}-C^*H(CH_3)-CH_2-A^{23}-A^{33}-A^{43}-R^2 \quad (1\text{-}3)$$

As specific examples of the compound (1), the following compounds may preferably be mentioned.

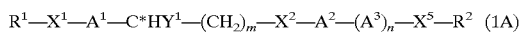
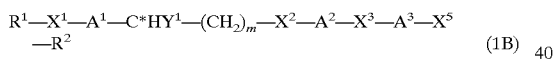
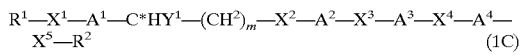
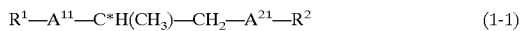
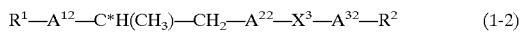
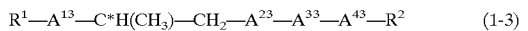
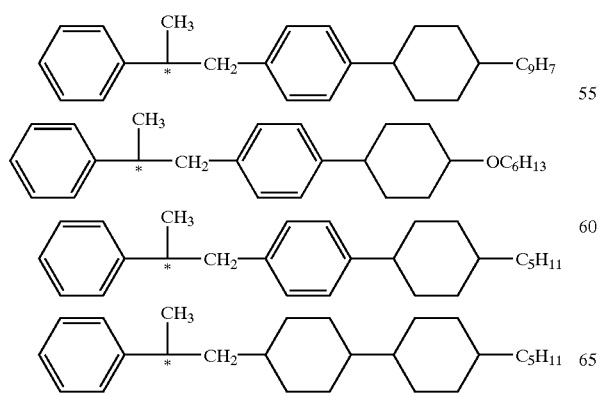

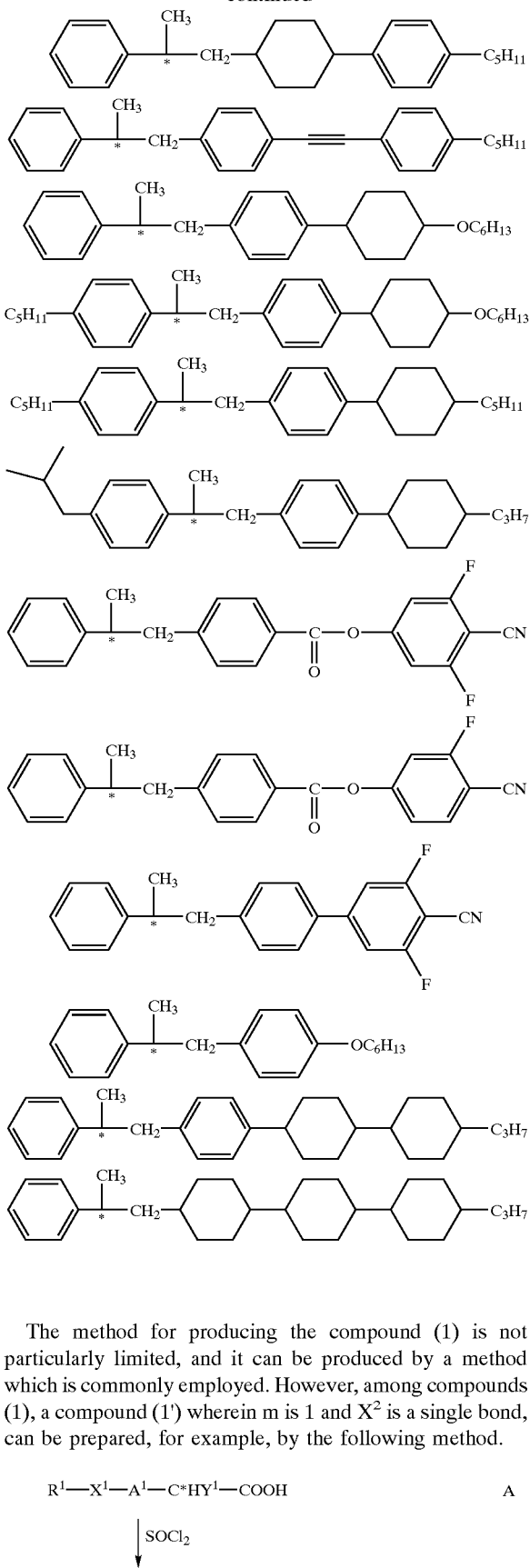

The method for producing the compound (1) is not particularly limited, and it can be produced by a method which is commonly employed. However, among compounds (1), a compound (1') wherein m is 1 and $X^2$ is a single bond, can be prepared, for example, by the following method.

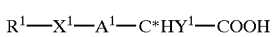

A

-continued

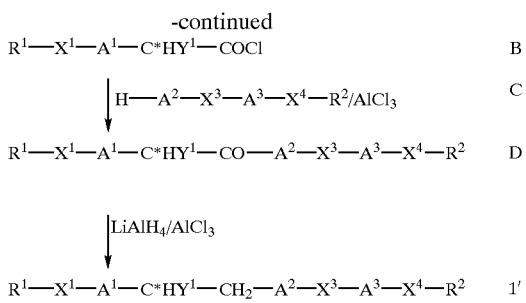

Namely, an optically active carboxy acid (formula A) is converted to an acid chloride (formula B) by means of thionyl chloride, and further reacted with a benzene derivative (formula C) in the presence of aluminum chloride to obtain a ketone derivative (formula D). Then, it is reduced with aluminum lithium hydride in the presence of aluminum chloride to obtain the desired compound (formula 1'). In each reaction, the optical purity of the optically active compound can be maintained.

Also in a case where m is 2 or more, such can be produced in a similar manner by using the corresponding carboxylic acid. Further, in a case where $X^2$ is other than a single bond or in a case where m is 0, such can be produced by a reaction of a bonding group such as $X^2$ or $X^3$, such as an esterification reaction, a Grignard reaction or a Friedel-crafts reaction.

The liquid crystal composition of the present invention is obtained by mixing the nematic liquid crystal and the optically active compound (1) at a temperature at which the entirety will become an isotropic phase. The blend ratio can be obtained by calculation by the formula $[c=1/(p \cdot HTP)]$ from HTP of the optically active compound which is preliminarily measured at a concentration of about 5% (by mass, the same applied hereinafter) and the desired helical pitch.

When plural optically active compounds are to be mixed, $HTP_{all}$ of the mixed optically active compounds can be roughly calculated by $[HTP_{all}=\Sigma HTP_i \cdot R_i]$, when the respective HTPs are represented by $HTP_i$ ($HTP_1$, $HTP_2$ . . . ), and the respective ratios in the optically active compound are represented by $R^i$ ($R_1$, $R_2$ . . . ). By carrying out the calculation by substituting $HTP_{all}$ for HTP of a single optically active compound, a rough value of the required amount of the optically active compounds can be obtained.

The liquid crystal optical element employing a chiral nematic liquid crystal is useful as a liquid crystal optical element which is bright with a wide viewing angle and a high contrast. In practical use, operation within a wide temperature range and storage stability are required like a usual liquid crystal optical element of STN or TN type. The specific operating temperature is required to be from 0 to +50° C. for household appliances, from −20 to +70° C. for applications to mobile phones, etc., and from −35 to +90° C. for applications to be mounted on cars. The storage temperature on a lower temperature side is required to be a temperature as low as −40° C. taking e.g. transportation by air crafts into consideration, and the storage temperature on a high temperature side is required to be a temperature of up to (the operating temperature +10° C.)

In the case of a liquid crystal optical element utilizing selective reflection of a chiral nematic liquid crystal, the helical pitch of the liquid crystal composition to be used, is designed so that visible light is selectively reflected, and accordingly, it will be remarkably small as compared with the helical pitch of STN or TN. Accordingly, from the above-described relation, the amount of the optically active compound tends to be large in many cases. The amount is at a level of from 8 to 60%, (in many cases, at a level of from 10 to 40%) in the composition with a chiral nematic liquid crystal, while it is from 0.5 to 3% in the composition with STN or TN.

However, if a single optically active compound is added in a large amount, the storage stability at a low temperature tends to be poor, and freeness in design of the phase transition temperature at a high temperature or the viscosity tends to be small, whereby there will be a problem that the requirements for the viscosity or Tc of the nematic liquid crystal tend to be strict. Further, many attempts have been made for liquid crystal compositions having plural optically active compounds are added, but each one has had a high viscosity, and Tc has been also not satisfactory.

In a case where a liquid crystal optical element is to be used within a wide temperature range, it is necessary to make Tc high, which is influential over the characteristics on a high temperature side, while it is necessary to pay attention to the viscosity which is influential over the characteristics on a low temperature side. With a liquid optical element, it is common that if the viscosity increases, the response speed tends to decrease. Further, as a characteristic of a liquid crystal optical element employing a chiral nematic liquid crystal, when the application time of a voltage is constant, if the temperature dependency of the viscosity is large, the temperature dependency of the level of the voltage required tends to be large. Further, especially at a low temperature, it takes time for the change to the focalconic state, and if the voltage application time is short, there will be a problem that only a low contrast will be obtainable. Accordingly, by lowering the viscosity, the temperature dependency of the driving voltage and the contrast at a low temperature can be improved, but in general, increase of Tc and decrease of the viscosity are antagonistic, and it has been difficult to satisfy both at the same time.

The present inventors have found that by incorporating a compound (1) of the present invention having a high HTP and a low viscosity as an optically active compound, Tc can be made to a level of from 55 to 88° C. and the viscosity can be made as small as from 45 to 100 mPa·s, and yet a liquid crystal composition which is stable within a wide temperature range, can be obtained, and they have accomplished the present invention. This liquid crystal composition is free from impairment of the quality such as disappearance of the display by crystallization, even when stored at −30° C. and can be operated at a low voltage, and thus it is suitable for a liquid crystal optical element.

Further, the liquid crystal composition of the present invention may contain optically active compounds (hereinafter referred to as other optically active compounds) other than the optically active compound of the compound (1). Such other optically active compounds are not particularly limited so long as the compatibility is good and they do not remarkably lower Tc. For example, the following compounds may be mentioned.

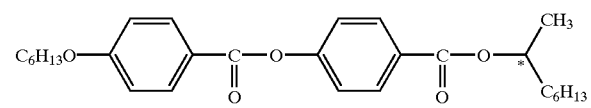

-continued

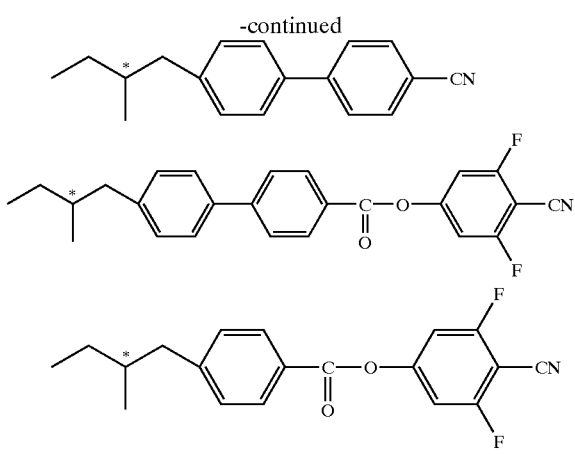

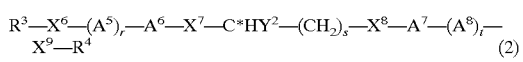

(2)

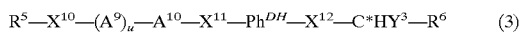

(3)

Here, the symbols in the formulae have the following meanings, provided that the same groups will not bond to the asymmetric carbon atom.

Each of $R^3$, $R^4$, $R^5$ and $R^6$ which are independent of one another, is a $C_{1-10}$ alkyl group, a $C_{1-10}$ alkenyl group or a hydrogen atom.

Each of $X^6$, $X^7$, $X^8$, $X^9$, $X^{10}$, $X^{11}$ and $X^{12}$ which are independent of one another, is —COO—, —OCO—, —OCH$_2$—, —O— or a single bond.

$X^7$ is —COO—, —OCO—, —OCH$_2$— or —O—.

Each of $A^5$, $A^6$, $A^7$, $A^8$, $A^9$ and $A^{10}$ which are independent of one another, is an unsubstituted trans-1,4-cyclohexylene group or a 1,4-phenylene group which may have at least one hydrogen atom substituted by a halogen atom.

C* is an asymmetric carbon atom.

Each of $Y^2$ and $Y^3$ which are independent of each other, is a methyl group which may have at least one hydrogen atom substituted by a halogen atom, a phenyl group which may have at least one hydrogen atom substituted by a halogen atom, an unsubstituted cyclohexyl group or a halogen atom.

s is an integer of from 1 to 5.

Each of r, t and u which are independent of one another, is 0 or 1.

Ph$^{DH}$ is a 1,4-phenylene group having hydrogen atoms at the 2- and 6-positions substituted by halogen atoms.

Among them, as such other optically active compounds, optically active compounds of compound (2) and compound (3) are preferably employed. Especially when the compound (1) having little cyclic group, is employed, the viscosity of the liquid crystal composition can be reduced substantially, but at the same time, Tc of the liquid crystal composition is likely to be low, and accordingly, it is preferred to use in combination an optically active compound such as the compound (2) or the compound (3) whereby the decrease of Tc is small.

In the compound (2), each of $R^3$ and $R^4$ is preferably a $C_{1-6}$ alkyl group, a $C_{2-6}$ alkenyl group or a hydrogen atom. In a case where the alkenyl group includes a cis-alkenyl group and a trans-alkenyl group, the trans-alkenyl group is preferred. Further, $R^3$ and $R^4$ preferably have straight chain structures.

Each of $X^6$ and $X^9$ is preferably a single bond or —O—. $X^7$ is preferably —COO— or —OCO—. $X^8$ is preferably a single bond, —COO— or —OCO—.

When each of $A^5$, $A^6$, $A^7$, and $A^8$ which are independent of one another, is a 1,4-phenylene group which may have at least one hydrogen atom substituted by a halogen atom, the position of substitution of the halogen atom is not particularly limited. As $A^5$ or $A^8$, an unsubstituted trans-1,4-cyclohexylene group is preferred. As $A^6$ or $A^7$, an unsubstituted 1,4-phenylene group is preferred.

$Y^2$ is preferably a phenyl group which may have at least one hydrogen atom substituted by a halogen atom, particularly preferably an unsubstituted phenyl group.

As s, 1 or 2 is preferred, and 1 is particularly preferred.

When $Y^2$ is a phenyl group which may have at least one hydrogen atom substituted by a halogen atom, or an unsubstituted cyclohexyl group, at least one of r and t is preferably 1, and particularly preferably, both are 1. Otherwise, it is preferred that both r and t are 0, or only one of them is 1. Namely, as the compound (2), a compound having 2, 3 or 4 cyclic groups, is preferred. The number of cyclic groups is more preferably four. When $Y^2$ is a methyl group which may have at least one hydrogen atom substituted by a halogen atom, or a halogen atom, the number of cyclic groups is preferably 2 or 3.

The compound (2) is a compound having a high Tc and a very large HTP. For example, the following compound is preferably employed.

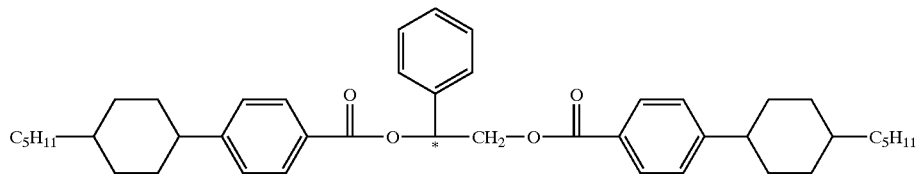

In the compound (3), each of $R^5$ and $R^6$ is preferably a $C_{1-6}$ alkyl group, a $C_{2-6}$ alkenyl group, or a hydrogen atom. In a case where the alkenyl group includes a cis-alkenyl group and a trans-alkenyl group, the trans-alkenyl group is further preferred. Further, $R^5$ and $R^6$ preferably have straight chain structures.

Each of $X^{10}$ and $X^{12}$, is preferably a single bond or —O—. $X^{11}$ is preferably a single bond, —COO— or —OCO—.

When each of $A^9$ and $A^{10}$ which are independent of each other, is a 1,4-phenylene group having at least one hydrogen atom substituted by a halogen atom, the position of substitution of the halogen atom is not particularly limited. As $A^9$ or $A^{10}$, an unsubstituted trans-1,4-cyclohexylene group or an unsubstituted 1,4-phenylene group is preferred.

$Y^3$ is preferably a methyl group which may have at least one hydrogen atom substituted by a halogen atom, particularly preferably a methyl group or a trifluoromethyl group.

The halogen atom in Ph$^{DH}$ is preferably a fluorine atom.

The compound (3) is preferably a compound having 2 or 3 cyclic groups. The number of cyclic groups is preferably 3. In a case where Y³ is a phenyl group which may have at least one hydrogen atom substituted by a halogen atom, or an unsubstituted cyclohexyl group, the number of cyclic groups is preferably 4.

The compound (3) is a compound whereby the helical pitch length is particularly short, Tc is high, and HTP is large. For example, the following compound is preferably employed.

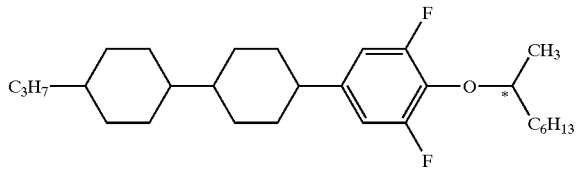

When a plurality of optically active compounds are to be mixed, the mixing ratio is not particularly limited. The content of the compound (1) based on the total amount of optically active compounds, is preferably at least 20%, more preferably at lest 30%, particularly preferably at least 40%. One type of the compound (1) may be used alone, but from the viewpoint of compatibility, it is preferred to employ at least two types of the compound (1) as mixed. Particularly when the content of the compound (1) based on the total amount of optically active compounds, is more than 60%, it is preferred to employ at least three types of the compound (1) as mixed. Further, it is also preferred to employ the compound (2), the compound (3) and at least one type selected from the above-mentioned other optically active compounds, as mixed. In such a case, of the total amount of the optically active compounds, the content of one type of an optically active compound in the largest content is preferably adjusted to be at most 70%, particularly preferably at most 60%.

The nematic liquid crystal to be combined with the optically active compound, is not particularly limited so long as the compatibility with the optically active compound has no problem, but nematic liquid crystals of biphenyl type, tolan type, pyrimidine type, cyclohexane type, difluorostilbene type, etc., may be used alone or as mixed.

As the liquid crystal composition of the present invention, a liquid crystal composition comprising the compound (1) and the nematic liquid crystal, is preferred.

Further, with respect to the characteristics of the nematic liquid crystal, in order to secure brightness and adjust the contrast high, Δn is preferably at least 0.18, more preferably from 0.18 to 0.3, particularly preferably from 0.21 to 0.26. If Δn is too small, the reflectance of the planer tends to be low, the half value width of the selective reflection tends to be small, and the brightness decreases, such being undesirable. Even when Δn is less than 0.18, the reflectance can be made high by increasing the driving voltage and making the cell gap thick. Further, if Δn exceeds 0.3, the focalconic scattering tends to be intensified, and due to the contribution of its back scattering, the contrast to the reflection state of the planer decreases.

Further, Tc of the nematic liquid crystal is preferably at least 70° C., more preferably at least 80° C., further preferably at least 90° C. Tc of the liquid crystal composition having the optically active compound added, tends to be lower than Tc of the nematic liquid crystal in many cases, and in order to make Tc of the liquid crystal composition high, it is preferred to make Tc of the nematic liquid crystal high, so long as the crystallization or the viscosity increase in a low temperature region is within an allowable range.

Δ∈ of the nematic liquid crystal is preferably at least 5, more preferably at least 10, particularly preferably at least 13. If Δ∈ is too small, the driving voltage becomes high, whereby an inexpensive driving IC for common TN or STN, can not be used, and an expensive driving IC tends to be required, the power consumption of e.g. the power source portion tends to be large, whereby the power saving effect tends to be small. The driving IC for current TN or STN usually has a voltage resistance at a level of 42 V, whereby Δ∈ is preferably at least 10.

From the foregoing, with a nematic liquid crystal, particularly preferably, Δn is from 0.21 to 0.26, Tc is at least 70° C. and Δ∈ is at least 10.

Further, the liquid crystal composition of the present invention may contain in addition to the compound (1), the nematic liquid crystal and said other optically active compounds, other liquid crystal materials or other non-liquid crystal materials (these will hereinafter be generally referred to as "other materials").

The following compounds may be exemplified as such other materials, wherein each of R⁷ and R⁸ which are independent of each other, is an alkyl group, an alkenyl group, an alkoxy group, a halogen atom or a cyano group, and at least one hydrogen atom in R⁷ and R⁸ may be substituted by e.g. a halogen atom or a cyano group. Each of Z¹, Z², Z³ and Z⁴ which are independent of one another, is a cyclic structure of a five-membered ring or a six-membered ring (such as a cyclohexane ring, a benzene ring, a dioxane ring, a pyrimidine ring or a pyridine ring), which may be unsubstituted or substituted. Further, the bonding group between a ring and a ring may be the following other bonding group. Such other bonding group may, for example, be —CH₂O═, —CH═CH—, —N═N—, —CH═N—, —COOCH₂—, —OCOCH₂— or —COCH₂—. These may suitably be selected depending upon the desired performance. The following compounds are presented merely as examples, and compounds other than the following may be employed.

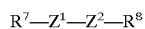
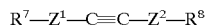
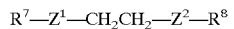
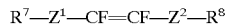
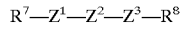
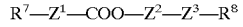
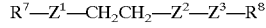
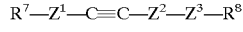
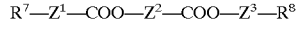
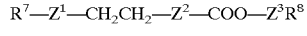
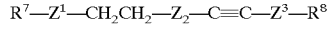
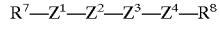
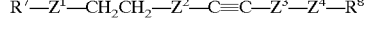

The liquid crystal optical element in the present invention can be produced by a method such that the above-described liquid crystal composition is injected into a liquid crystal cell, and it is preferred that the liquid crystal composition is interposed between a pair of electrode-attached substrates. Further, the liquid crystal optical element in the present invention is preferably such that the liquid crystal composition is interposed between a pair of electrode-attached substrates, of which at least one is transparent. The liquid crystal optical element in the present invention is preferably such that row electrodes and column electrodes are disposed on one substrate and the other substrate, respectively.

In the liquid crystal optical element, the distance between the pair of opposing electrodes is preferably from 2 to 20 μm.

Further, in the above liquid crystal optical element, the electrodes on the substrates and the liquid composition may be in direct contact with each other, or may be in contact via an inorganic thin film of e.g. polyimide or an inorganic thin film of e.g. silica, The liquid crystal optical element may be used in various systems such as a cholesteric LCD or DAP system, a two-frequency driving system and a ferroelectric liquid crystal display element system. Among them, the liquid composition of the present invention is useful particularly for a liquid crystal optical element of a cholesteric LCD system.

Now, the liquid crystal optical element of the present invention will be described in further detail. The liquid crystal optical element of the present invention is an element which exhibits a selective reflection state and a (fine) scattering state without applying a voltage by means of the liquid crystal composition of the present invention.

FIG. 1 shows an example of a schematic cross-sectional view of the liquid crystal optical element of the present invention. In the liquid crystal optical element 10, the liquid crystal composition 4 is interposed between a pair of substrates 1A and 1B. The pair of substrates 1A and 1B are provided on their inner surfaces with electrodes 2A and 2B formed in a stripe pattern and arranged so that the stripe pattern electrodes cross each other (row electrodes and column electrodes) to have a structure such that display data are written in by using the portions where the upper and lower electrodes cross each other, as pixels. Further, on the outer surface of the substrate 1A, a light absorber 5 is provided which absorbs fine scattering in the focalconic state.

For the substrates 1A and 1B, glass substrates or resin substrates may, for example, be employed. They may be a combination of a glass substrate and a resin substrate. When it is used as a reflection display element, the optical absorber 5 may be provided on the inner surface or the outer surface of either one of the substrates, or a light absorber having a light absorbing function may be used for the substrate itself. As the light absorber, a resin-formed product (a plate or film) containing a black pigment such as carbon, a resin-formed product containing a black pigment in an adhesive or a bonding agent, a coating by a spray containing a black pigment, a coating with a coating material containing a black pigment, a resin-formed product containing a pigment which absorbs a part of visible light such as red, orange, yellow, green, blue or purple, or an anti-reflection film employing an adhesive agent, a coating or a dielectric multilayer film, may be mentioned as a preferred example.

On the surfaces having electrodes formed of the pair of substrates 1A and 1B, organic thin films of e.g. polyimide or inorganic thin films 3A and 3B of e.g. silica, may or may not be formed. The organic thin films or the inorganic thin films are not particularly limited, and conventional ones may be employed. If rubbing (an organic thin film of e.g. polyimide formed on the electrodes, is rubbed in one direction with e.g. a cloth) which is commonly carried out for a liquid crystal optical element of TN or STN, is carried out, depending upon the type of the thin film, the stability of the focalconic of the chiral nematic liquid crystal is likely to be lost. Accordingly, in order to obtain a liquid crystal optical element with a low power consumption utilizing a memory function, it is usually preferred not to conduct rubbing or to bring the electrodes and the liquid crystal composition in direct contact with each other, when an organic thin film to be used for TN and STN, is provided on the electrodes.

The distance (the cell gap) between the electrodes 2A and 2B can be maintained by e.g. a spacer, and the cell gap is preferably from 2 to 20 μm, particularly preferably from 3 to 6 μm. If the cell gap is too small, the contrast tends to decrease, and if it is too large, the driving voltage tends to increase. The spacer is not particularly limited, and resin beads, silica beads, etc. may preferably be mentioned.

In FIG. 1, the display node (transparent electrode forming pattern) is a full dot display, where the upper and lower electrodes cross each other, but other display mode may be employed. For example, a segment display or a dot character display may be mentioned. However, the display mode is optionally selected depending upon the particular application.

The upper and lower transparent electrodes are, respectively, stripe patterns, which are formed in parallel with one another with a predetermined distance. Each of the transparent electrodes is preferably made of ITO (indium.tin oxide).

The liquid crystal optical element can he obtained by scattering a very small amount of a spacer within the electrode surfaces, sealing the four sides of the opposing substrates with a sealing material such as an epoxy resin to form a cell, dipping a notch of the seal in a liquid crystal composition in a vacuumed state, returning it to atmospheric pressure to fill the liquid crystal composition in the cell, and sealing the inlet with a photocurable resin.

The obtained liquid crystal optical element can be operated, for example, as follows. Namely, a terminal area is provided on the substrate of the row electrodes side, and at the terminal area, a lead electrode group is formed. The row electrodes are directly connected to predetermined electrodes within this lead electrode group. Whereas, the column electrodes are connected to the predetermined electrodes in the lead electrode group via a transfer material such as conductive beads contained in the sealing material. The electrode group may be formed on each substrate independently without using the transfer material. In this manner, a driving IC is set to apply a driving waveform. When the liquid crystal composition of the present invention is employed, the driving voltage is sufficient at a level of about 40 V at the maximum.

The above description is to show the basic construction and the method for production of the liquid crystal optical element. Other than the above, various types such as substrates employing double layer electrodes, a double layer liquid crystal cell having double liquid crystal layers formed, an active matrix display employing active matrix substrates having active elements such as TFT or MIM formed, may, for example, be used.

As described in the foregoing, the liquid crystal composition of the present invention can accomplish a high Tc, a low viscosity and stability within a wide temperature range by using the optically active compound of the compound (1). Further, by the combination with a nematic liquid crystal having optimum characteristics (Δn, Δ∈ and Tc), the cholesteric LCT employing the liquid crystal composition of the present invention, has a high response speed with a low driving voltage, is bright, as a wide viewing angle and a high contrast and can be used in a wide temperature range (excellent particularly in the quality maintenance at a low temperature).

EXAMPLES

Now, Examples 1 to 18 will be described in detail.

In each Example, the viscosity was measured by a Brookfield viscometer (type: DV-III, spindle; CP-25, temperature: 25° C.).

Example 1

A liquid crystal composition A comprising 81.6 parts by mass of a commercially available nematic liquid crystal (Tc=96.7° C., Δn=0.242, Δ∈=13.8) (hereinafter referred to as nematic liquid crystal A) and 18.4 parts by mass of the following compound (10), was prepared.

This liquid crystal composition A maintained a cholesteric phase at least within a range of from −30° C. to +67° C., had a wide operating temperature range or a wide storage temperature range, had a viscosity of 50 mPa·s and showed excellent characteristics as a liquid crystal composition.

A pair of glass substrates having transparent electrodes were opposed, a very small amount of resin beads having a diameter of 4 μm were scattered, and via the resin beads, they were bonded by an epoxy resin printed in a width of about 1 mm along the four sides to form a cell. To this cell, the liquid crystal composition A was injected to prepare a liquid crystal optical element. On the outer surface of one substrate of the liquid crystal optical element, a member capable of absorbing visible light was disposed, so that it looked black in the focalconic state.

To this liquid crystal optical element, an AC pulse voltage having a 20 ms width was applied at 25° C., whereby by adjusting the voltage level, it was possible to switch to the planer state and the focalconic state, respectively. In the planer state, it showed a bright selective reflection color of green, and in the focalconic state, it showed a dark black color. The voltage (the driving voltage) at which the focalconic state was changed to the planer state via a homeotropic state, was 28 V.

Example 2

A liquid crystal optical element was prepared in the same manner as in Example 1 except that an organic thin film made of polyimide was formed on the inner surfaces of the glass substrates. To this liquid crystal optical element, the voltage was applied in the same manner as in Example 1. The selective reflection color was green. In the same manner as in Example 1, the driving voltage was measured, and it was 35 V.

Example 3

A liquid crystal composition B comprising 80.3 parts by mass of the nematic liquid crystal A and 19.7 parts by mass of the following compound (11), was prepared.

This liquid crystal composition B maintained a cholesteric phase at least within a range of from −30° C. to +43° C., but the temperature on the high temperature side was low, and even at 25° C., a part was not compatibilized, and thus, it was not proper to be used for a liquid crystal optical element. In the planer state, it showed a selective reflection color of green.

Example 4

A liquid crystal composition C comprising 85.6 parts by mass of a commercially available nematic liquid crystal ("MJ00423", manufactured by Merck Japan Limited: Tc=94.0° C., Δn=0.230, Δ∈=15.0), 4.8 parts by mass of the compound (10), 4.8 parts by mass of the compound (12) and 4.8 parts by mass of the compound (13), was prepared. This liquid crystal composition C maintained a cholesteric phase at least within a range of from −30° C. to +80° C., had a wide operating temperature range or a wide storage temperature range, had a viscosity of 66 mPa·s and showed excellent characteristics as a liquid crystal composition. A liquid crystal optical element was prepared in the same manner as in Example 1, whereby in the planer state, it showed a bright selective reflection color of green, and in the focalconic state, it showed a dark black color. In the same manner as in Example 1, the driving voltage was measured, and it was 25 V.

Example 5

A liquid crystal composition D comprising 85.21 parts by mass of a commercially available nematic liquid crystal ("AF2105", manufactured by Seimi Chemical CO., LTD.: Tc=96.5° C., Δn=0.237, Δ∈=16.2), 4.93 parts by mass of the compound (10), 4.93 parts by mass of the compound (12) and 4.93 parts by mass of the compound (13), was prepared. This liquid crystal composition D maintained a cholesteric phase at least within a range of from −30° C. to +80° C., had a wide operating temperature range or a wide storage temperature range, had a viscosity of 66 mPa·s and showed excellent characteristics as a liquid crystal composition.

In the same manner as in Example 1, a liquid crystal optical element was prepared, whereby in the planer state, it showed a selective reflection of green, and in the focalconic state, it showed a dark black color. In the same manner as in Example 1, the driving voltage was measured, and it was 25 V.

Example 6

A liquid crystal composition E comprising 71.7 parts by mass of a commercially available nematic liquid crystal ("AF2180", manufactured by Seimi Chemical Co., LTD.: Tc=110.2° C., Δn=0.231, Δ∈=16.1), 9.43 parts by mass of the compound (13), 9.43 parts by mass of the compound (14) and 9443 parts by mass of the compound (15), was prepared. This liquid crystal composition E maintained a cholesteric phase at least within a range of from −30° C. to +88° C., had a wide operating temperature range or a wide storage temperature range, had a viscosity of 100 mPa·s and showed excellent characteristics as a liquid crystal composition.

In the same manner as in Example 1, a liquid crystal optical element was prepared, whereby in the planer state, it showed a selective reflection of green, and in the focalconic state, it showed a dark black color. In the same manner as in Example 1, the driving voltage was measured, and it was 20 V.

Example 7

A liquid crystal composition F comprising 82 parts by mass of a commercially available nematic liquid crystal ("AF2180", manufactured by Seimi Chemical CO., LTD.: Tc=110.2° C., Δn=0.231, Δ∈=16.1), 6 parts by mass of the compound (10), 6 parts by mass of the compound (16) and 6 parts by mass of the compound (17), was prepared. This liquid crystal composition F maintained a cholesteric phase at least within a range of from −30° C. to +79° C., had a wide operating temperature range or a wide storage temperature range, had a viscosity of 52 mPa·s and showed excellent characteristics as a liquid crystal composition.

In the same manner as in Example 1, a liquid crystal optical element was prepared, whereby in the planer state, it showed a selective reflection of green, and in the focalconic state, it showed a dark black color. In the same manner as in Example 1, the driving voltage was measured, and it was 27 V.

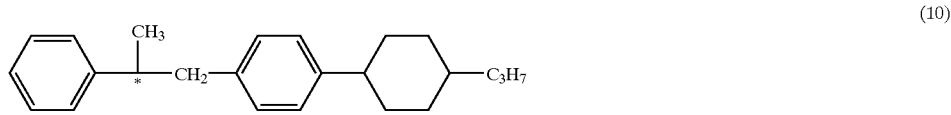

(10)

(11)

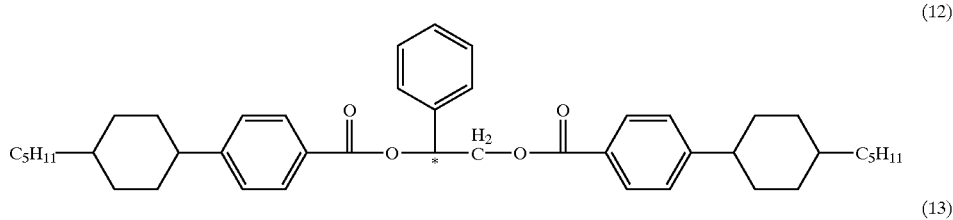

(12)

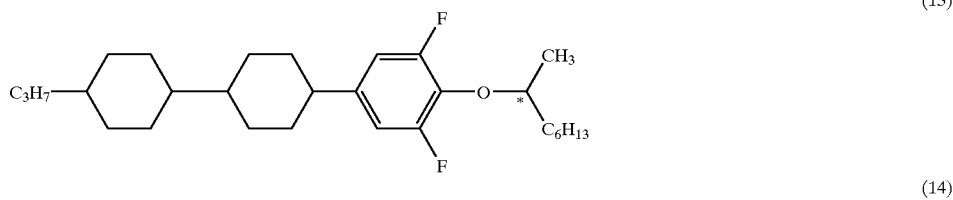

(13)

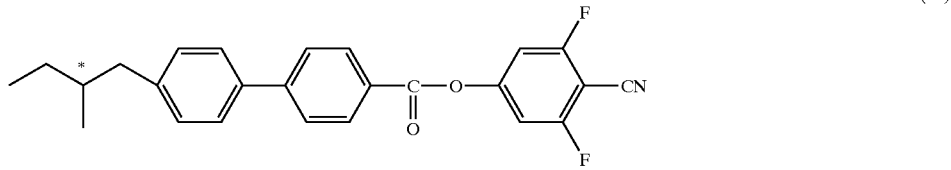

(14)

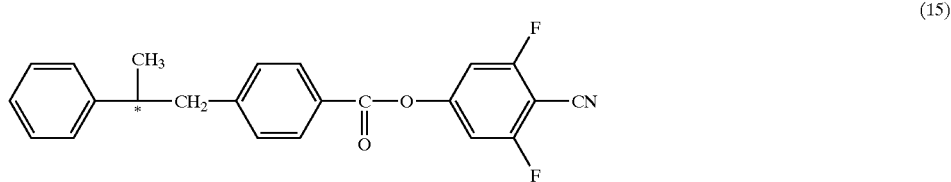

(15)

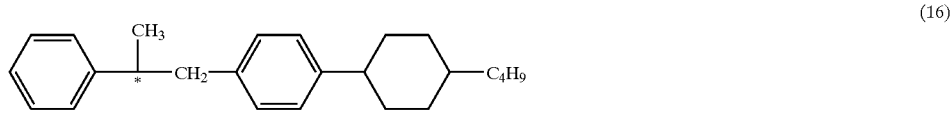

(16)

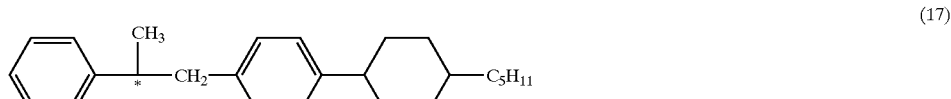

(17)

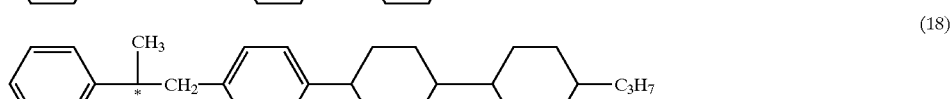

(18)

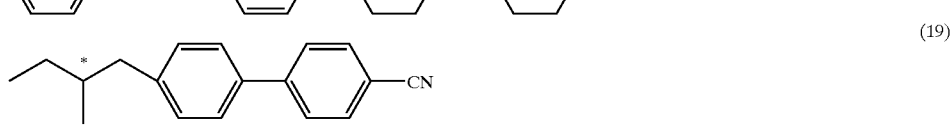

(19)

Example 8

A liquid crystal composition G comprising 79.5 parts by mass of a commercially available nematic liquid crystal ("AF2213", manufactured by Seimi Chemical CO., LTD. Tc=107.1° C., Δn=0.232, Δ∈=17.1), 6.83 parts by mass of the compound (10), 6.83 parts by mass of the compound (13)

and 6.83 parts by mass of the compound (17), was prepared. This liquid crystal composition G maintained a cholesteric phase at least within a range of from −30° C. to +81° C., had a wide operating temperature range or a wide storage temperature range, had a viscosity of 57 mPa·s and showed excellent characteristics as a liquid crystal composition.

In the same manner as in Example 1, a liquid crystal optical element was prepared, whereby in the planer state, it showed a selective reflection of green, and in the focalconic state, it showed a dark black color. In the same manner as in Example 1, the driving voltage was measured, and it was 27 V.

Example 9

A liquid crystal composition H comprising 76.6 parts by mass of a commercially available nematic liquid crystal ("AF2213", manufactured by Seimi Chemical CO., LTD.: Tc=1071.1° C., Δn=0.232, Δ∈=17.1), 7.8 parts by mass of the compound (10), 7.8 parts by mass of the compound (13) and 7.8 parts by mass of the compound (18), was prepared. This liquid crystal composition G maintained a cholesteric phase at least within a range of from −30° C. to +89° C., had a wide operating temperature range or a wide storage temperature range, had a viscosity of 63 mPa·s and showed excellent characteristics as a liquid crystal composition, In the same manner as in Example 1, a liquid crystal optical element was prepared, whereby in the planer state, it showed a selective reflection of green, and in the focalconic state, it showed a dark black color. In the sane manner as in Example 1, the driving voltage was measured, and it was 27 V.

Example 10

A liquid crystal composition I comprising 79.3 parts by mass of a commercially available nematic liquid crystal ("AF2213", manufactured by Seimi Chemical CO., LTD.: Tc=107.1° C., Δn=0.232, Δ∈=17.1), 6.77 parts by mass of the compound (10), 6.77 parts by mass of the compound (17) and 6.77 parts by mass of the compound (18), was prepared. This liquid crystal composition I maintained a cholesteric phase at least within a range of from −30° C. to +86° C., had a wide operating temperature range or a wide storage temperature ranger had a viscosity of 60 mPa·s and showed excellent characteristics as a liquid crystal composition.

In the same manner as in Example 1, a liquid crystal optical element was prepared, whereby in the planer state, it showed a selective reflection of green, and in the focalconic state, it showed a dark black color. In the same manner as in Example 1, the driving voltage was measured, and it was 27 V.

Example 11

A liquid crystal composition J comprising 79.5 parts by mass of a commercially available nematic liquid crystal ("AF2213", manufactured by Seimi Chemical CO., LTD.: Tc=107.1° C, Δn=0.232, Δ∈=17.1), 6.83 parts by mass of the compound (10), 6.83 parts by mass of the compound (16) and 6.83 parts by mass of the compound (18), was prepared. This liquid crystal composition J maintained a cholesteric phase at least within a range of from −30° C. to +85° C., had a wide operating temperature range or a wide storage temperature range, had a viscosity of 59 mPa·s and showed excellent characteristics as a liquid crystal composition.

In the same manner as in Example 1, a liquid crystal optical element was prepared, whereby in the planer state, it showed a selective reflection of green, and in the focalconic state, it showed a dark black color. In the same manner as in Example 1, the driving voltage was measured, and it was 27 V.

Example 12

A liquid crystal composition comprising 83.6 parts of the nematic liquid crystal A, 5.47 parts of the compound (11), 5.47 parts of the compound (12) and 5.47 parts of the compound (13), was prepared.

This liquid crystal composition maintained a cholesteric phase at least within a range of from −30° C. to +70° C., had a wide operating temperature range or a wide storage temperature range, had a viscosity of 59 mPa·s and showed excellent characteristics as a liquid crystal composition.

In the same manner as in Example 1, a liquid crystal optical element was prepared, whereby in the planer state, it showed a selective reflection of green, and in the focalconic state, it showed a dark black color. In the same manner as in Example 1, the driving voltage was measured, and it was 28 V.

Example 13

A liquid crystal composition comprising 86.7 parts of the nematic liquid crystal A, 6.65 parts of the compound (11) and 6.65 parts of the compound (12), was prepared. This liquid crystal composition maintained a cholesteric phase at least within a range of from −300° C. to +67° C., had a wide operating temperature range or a wide storage temperature range, had a viscosity of 60 mPa·s and showed excellent characteristics as a liquid crystal composition.

Then, in the same manner as in Example 1, a liquid crystal optical element was prepared. The liquid crystal optical element showed a bright selective reflection color of yellowish green in the planer state, and it showed a dark black color in the focalconic state. The voltage at which the focalconic state became the planer state via a homeotropic state, was 30 V.

Example 14

A liquid crystal composition comprising 76.1 parts of the nematic liquid crystal A, 11.95 parts of the compound (11) and 11.95 parts of the compound (13), was prepared. This liquid crystal composition maintained a cholesteric phase at least within a range of from −30° C. to +57° C., had a wide operating temperature range or a wide storage temperature range, had a viscosity of 49 mPa·s and showed excellent characteristics as a liquid crystal composition.

Then, in the same manner as in Example 1, a liquid crystal optical element was prepared. The liquid crystal optical element showed a bright selective reflection color of green in the planer state, and it showed a dark black color in the focalconic state. The voltage at which the focalconic state became the planer state via a homeotropic state, was 30 V.

Example 15

A liquid crystal composition comprising 80.3 parts of the nematic liquid crystal A and 19.7 parts of the compound (11), was prepared, This liquid crystal composition showed a selective reflection color of green, but it was not completely uniformly dissolved, and it was not suitable to be used for a liquid optical element.

Example 16

A liquid crystal composition comprising 89.9 parts of the nematic liquid crystal A and 10.1 parts of the compound (12), was prepared. This liquid crystal composition showed a selective reflection color of green, but when it was stored at −30° C. for two days, crystals precipitated. Accordingly, this liquid crystal composition was not suitable to be used for a liquid optical element, when the storage reliability at a low temperature is taken into consideration.

Example 17

A liquid crystal composition comprising 69.6 parts of the nematic liquid crystal A and 30.4 parts of the compound (13), was prepared. This liquid crystal composition showed a selective reflection color of green, but when it was cooled to 8° C., crystallization started. Therefore, it was not suitable to be used for a liquid optical element, if the storage reliability at a low temperature is taken into consideration.

Example 18

A liquid crystal composition comprising 66.5 parts of the nematic liquid crystal A, 16.75 parts of the i, compound (13) and 16.75 parts of the compound (19), was prepared. This liquid crystal composition showed a selective reflection color of green, but when it was cooled to −16° C., crystallization started. Therefore, it was not suitable to be used for a liquid optical element, is if the storage reliability at a low temperature is taken into consideration. Further, the viscosity was 78 mPa·s.

According to the present invention, it is possible to obtain a liquid crystal composition which has a low viscosity, is excellent in compatibility and has a wide operation temperature range and a wide storage temperature range. The liquid crystal optical element employing the liquid crystal composition of the present invention can be operated at a low voltage, and once the state is controlled by application of an electric field, application of an electric field is no longer necessary, and the power consumption can be made very small. Further, the reflectance at the time of the selective reflection is high, and a high contrast can be obtained, whereby it is useful for e.g. a display device where high visibility or a low power consumption is required.

Further, the change in the display characteristics of the element due to repetition of the application of an electric field to the liquid crystal optical element/operation during non-application of an electric field, is small, whereby it is possible to provide a liquid crystal optical element having high reliability.

What is claimed is:

1. A liquid crystal composition comprising an optically active compound of the following formula (1) and a nematic liquid crystal:

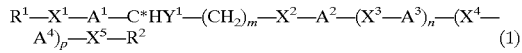

wherein the symbols have the following meanings:
$R^1$ is a $C_{1-10}$ alkyl group, a $C_{2-10}$ alkenyl group or a hydrogen atom;
$R^2$ is a $C_{1-10}$ alkyl group, a $C_{2-10}$ alkenyl group, a hydrogen atom or a cyano group;
each of $X_1$, $X_2$ and $X_5$ which are independent of one another, is —COO—, —OCO—, —OCH$_2$—, —O— or a single bond;
each of $X^3$ and $X^4$ which are independent of each other, is —COO—, —OCO—, —CH$_2$CH$_2$—, —C≡C—, —O— or a single bond;
each of $A^1$ to $A^4$ which are independent of one another, is an unsubstituted trans-1,4-cyclohexylene group, or a 1,4-phenylene group which may have at least one hydrogen atom substituted by a halogen atom;
C* is an asymmetric carbon;
$Y^1$ is a $C_{1-2}$ alkyl group which may have at least one hydrogen atom substituted by a halogen atom, or a halogen atom;
m is an integer of from 0 to 5; and
each of n and p which are independent of each other, is 0 or 1.

2. The liquid crystal composition according to claim 1, wherein $R^1$ is a $C_{1-10}$ alkyl group or a hydrogen atom, and $R^2$ is a $C_{1-10}$ alkyl group, a hydrogen atom or a cyano group.

3. The liquid crystal composition according to claim 1, wherein the compound of the formula (1) is a compound of the formula (1A), (1B) or (1C);

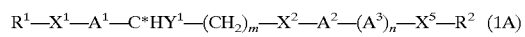

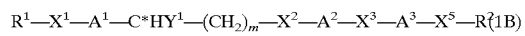

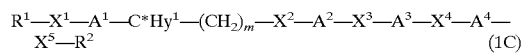

wherein $R^1$, $R^2$, $X^1$ to $X^5$, $A^1$ to $A^4$, C*, $Y^1$, m and n are as defined above.

4. The liquid crystal composition according to claim 1, which further contains a compound of the following formula (2) and/or (3):

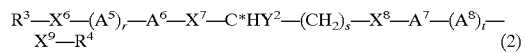

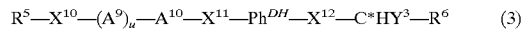

wherein the symbols have the following meanings:
each of $R^3$, $R^4$, $R^5$ and $R^6$ which are independent of one another, is a $C_{1-10}$ alkyl group, a $C_{2-10}$ alkenyl group or a hydrogen atom;
each of $X^6$, $X^8$, $X^9$, $X^{10}$, $X^{11}$ and $X^{12}$ which are independent of one another, is —COO—, —OCO—, —OCH$_2$—, —O— or a single bond;
$X^7$ is —COO—, —OCO—, —OCH$_2$— or —O—;
each of $A^5$, $A^6$, $A^7$, $A^8$, $A^9$ and $A^{10}$ which are independent of one another, is an unsubstituted trans-1,4-cyclohexylene group or a 1,4-phenylene group which may have at least one hydrogen atom substituted by a halogen atom;
C* is an asymmetric carbon;
each of $Y^2$ and $Y^3$ which are independent of each other, is a methyl group which may have at least one hydrogen atom substituted by a halogen atom, a phenyl group which may have at least one hydrogen atom substituted by a halogen atom, an unsubstituted cyclohexyl group or a halogen atom;
s is an integer of from 1 to 5;
each of r, t and u which are independent of one another, is 0 or 1; and
Ph$_{DH}$ is a 1,4-phenylene group having hydrogen atoms at the 2- and 6-positions substituted by halogen atoms.

5. The liquid crystal composition according to claim 1, wherein the compound of the formula (1) is a compound of the following formula:

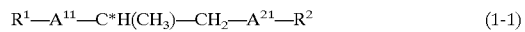

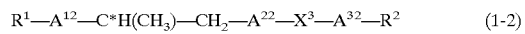

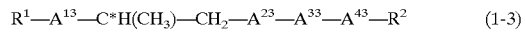

wherein the symbols have the following meanings;

$R^1$, $R^2$ and $X^3$ are as defined above; and each of $A^{11}$, $A^{21}$, $A^{12}$, $A^{22}$, $A^{32}$, $A^{13}$, $A^{23}$, $A^{33}$ and $A^{43}$ which are independent of one another, is an unsubstituted trans-1,4-cyclohexylene group, or a 1,4-phenylene group which may have at least one hydrogen atom substituted by a halogen atom.

6. The liquid crystal composition according to claim 1, wherein the refractive index anisotropy (Δn) of the nematic liquid crystal is at least 0.18; the nematic isotropic phase transition temperature (Tc) is at least 70° C.; and the dielectric anisotropy (Δ∈) is at least 5.

7. The liquid crystal composition according to claim 1, wherein the liquid crystal composition is a liquid crystal composition which selectively reflects visible light in a planar state.

8. A liquid crystal optical element having the liquid crystal composition of claim 1 interposed between a pair of electrode-attached substrates.

9. The liquid crystal optical element according to claim 8, wherein row electrodes and column electrodes are provided on one substrate and the other substrate, respectively.

10. The liquid crystal optical element according to claim 8, wherein the distance between the pair of the opposing electrodes is from 2 to 20 μm.

11. The liquid crystal composition according to claim 1, wherein $R^1$ is a $C_{1-6}$ alkyl group or a hydrogen atom, and $R^2$ is a $C_{1-6}$ alkyl group, a hydrogen atom or a cyano group.

12. The liquid crystal composition according to claim 1, wherein each of $X^1$ and $X^5$ is a single bond or —O—, $X^2$ is a single bond, —COO— or —OCO—, and each of $X^3$ and $X^4$ is —COO—, —C≡C— or a single bond.

13. The liquid crystal composition according to claim 1, wherein $A^1$ is a 1,4-phenylene group which may have at least one hydrogen atom substituted by a halogen atom.

14. The liquid crystal composition according to claim 1, wherein at least one group selected from $A^2$, $A^3$ and $A^4$ is an unsubstituted trans-1,4-cyclohexylene group.

15. The liquid crystal composition according to claim 1, wherein $Y^1$ is a $C_{1-2}$ alkyl group which may have at least one hydrogen atom substituted by a halogen atom.

16. The liquid crystal composition according to claim 1, wherein $A^1$ is an unsubstituted 1,4-phenylene group, and $Y^1$ is a methyl group which may have at least one hydrogen atom substituted by a halogen atom.

17. The liquid crystal composition according to claim 1, wherein $A^4$ is a 1,4-phenylene group which may have at least one hydrogen atom substituted by a halogen atom, and $R^2$ is a cyano group.

18. The liquid crystal composition according to claim 1, wherein m is 0, 1 or 2.

19. The liquid crystal composition according to claim 1, wherein the content of the compound of the formula (1) is at least 20% (by mass) based on the liquid crystal composition.

20. The composition according to claim 1, wherein compound us at least one member selected from the group consisting of

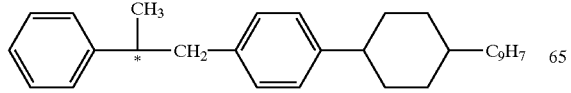

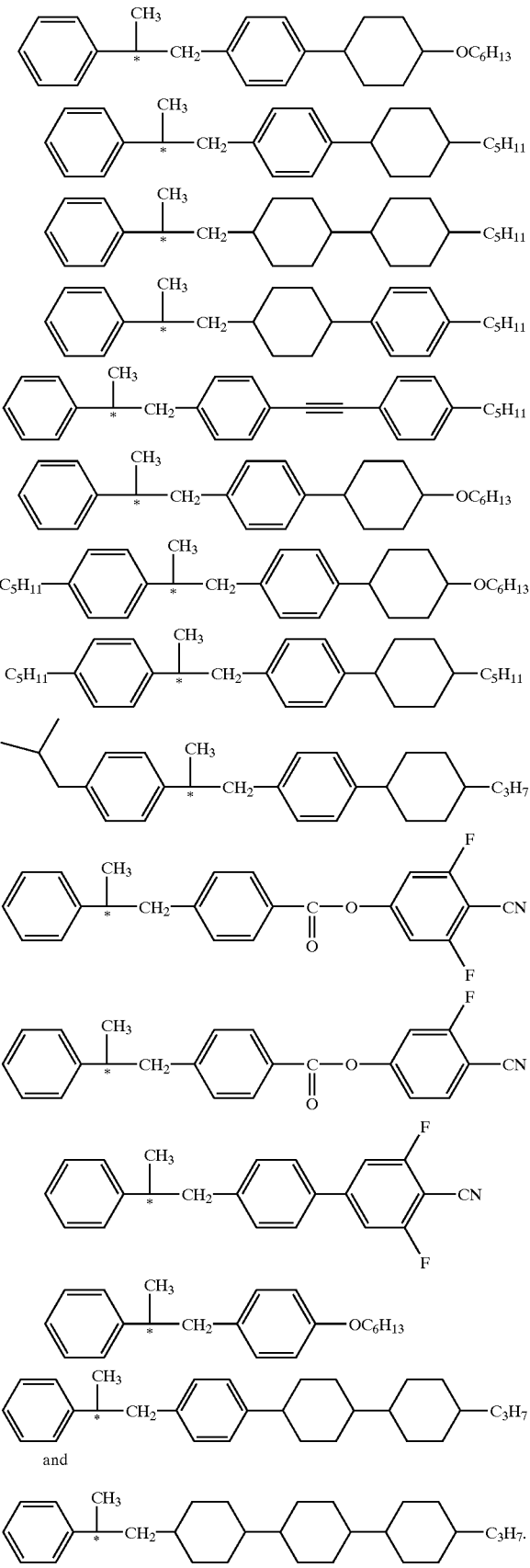

and

21. The composition according to claim 1, further comprising at least one compound selected from the group consisting of
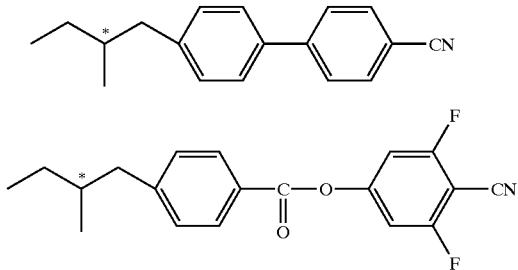
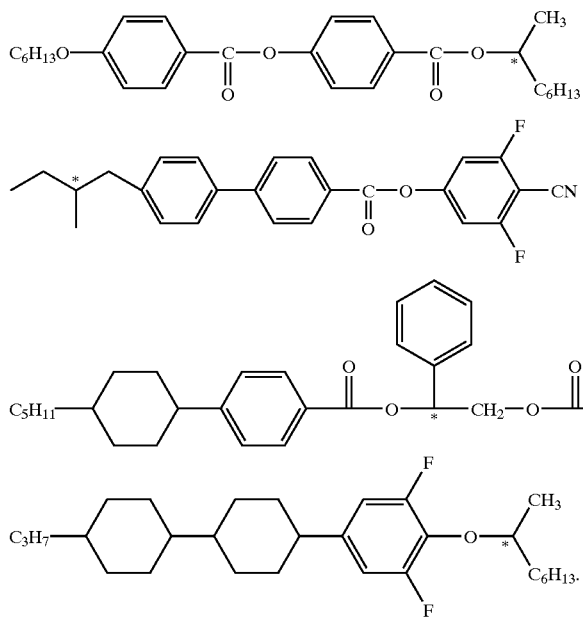
and